US009815714B2

(12) United States Patent
Franshaw

(10) Patent No.: US 9,815,714 B2
(45) Date of Patent: Nov. 14, 2017

(54) PROCESS FOR GENERATING OXYGENATED WATER

(71) Applicant: Slate Group, LLC, Dallas, TX (US)

(72) Inventor: Phillip Laurence Franshaw, Eagle, WI (US)

(73) Assignee: Slate Group, LLC, Dallas, TX (US)

( * ) Notice: Subject to any disclaimer, the term of this patent is extended or adjusted under 35 U.S.C. 154(b) by 778 days.

(21) Appl. No.: 13/711,303

(22) Filed: Dec. 11, 2012

(65) Prior Publication Data
US 2014/0158637 A1    Jun. 12, 2014

(51) Int. Cl.
C02F 1/00    (2006.01)
C02F 1/34    (2006.01)
(Continued)

(52) U.S. Cl.
CPC .......... C02F 1/4674 (2013.01); C02F 1/4676 (2013.01); C02F 1/72 (2013.01); C02F 1/283 (2013.01); C02F 1/722 (2013.01); C02F 1/76 (2013.01); C02F 1/78 (2013.01); C02F 2001/46133 (2013.01); C02F 2103/026 (2013.01); C02F 2201/46135 (2013.01); C02F 2201/46155 (2013.01); C02F 2201/46175 (2013.01); C02F 2209/02 (2013.01); C02F 2209/03 (2013.01); C02F 2209/04 (2013.01); C02F 2209/05 (2013.01); C02F 2209/07 (2013.01); C02F 2209/22 (2013.01); C02F 2301/046 (2013.01); C02F 2301/066 (2013.01); C02F 2303/185 (2013.01)

(58) Field of Classification Search
CPC . A23L 2/00; A61M 1/00; B01D 11/02; B01D 29/35; B65D 85/00; C25B 1/02

USPC ..... 204/229, 269, 275.1, 556, 663; 205/742, 205/743, 751–753, 755, 756; 210/652, 210/666, 748.17, 749, 750–753, 755, 756; 261/76, 78.1, 83; 422/237; 424/661; 426/67, 423, 475; 435/238; 510/161, 510/218, 379

See application file for complete search history.

(56) References Cited

U.S. PATENT DOCUMENTS 4,313,814 A    2/1982  Saito et al.
4,369,102 A    1/1983  Galluzzo et al.
(Continued)

FOREIGN PATENT DOCUMENTS

WO    WO2004112515    12/2004
WO    WO2007095094    8/2007

OTHER PUBLICATIONS

Jones (Oxygen—The Most Important Water Quality Parameter?, Water Column, (Spring 2011), vol. 23, No. 1, pp. 1-6).*
(Continued)

Primary Examiner — Dirk Bass
Assistant Examiner — Hayden Brewster
(74) Attorney, Agent, or Firm — Dunlap Codding, P.C.

(57) ABSTRACT

A method for increasing the quantity of dissolved oxygen in water includes addition of an oxidant to the water to increase the oxidation-reduction potential (ORP) of the water to between about 400 and 850 mV, followed by electrolysis to generate oxygen gas. The voltage applied to the electrolytic cells during electrolysis is less than 300 mV. The dissolved oxygen content of the water exiting the electrolytic cell is about 90% of saturation to super saturation.

13 Claims, 4 Drawing Sheets

(51) Int. Cl.
*C02F 1/48* (2006.01)
*C02F 1/467* (2006.01)
*C02F 1/72* (2006.01)
C02F 1/68 (2006.01)
C02F 1/76 (2006.01)
C02F 1/461 (2006.01)
C02F 1/28 (2006.01)
C02F 1/78 (2006.01)
C02F 103/02 (2006.01)

(56) References Cited

U.S. PATENT DOCUMENTS

| | | | |
|---|---|---|---|
| 5,728,287 A | 3/1998 | Hough et al. | |
| 5,911,870 A | 6/1999 | Hough | |
| 6,171,469 B1 | 1/2001 | Hough et al. | |
| 6,235,186 B1* | 5/2001 | Tanaka et al. | 205/521 |
| 6,284,293 B1 | 9/2001 | Crandall et al. | |
| 6,478,949 B1 | 11/2002 | Hough et al. | |
| 6,689,262 B2 | 2/2004 | Senkiw | |
| 7,100,542 B2 | 9/2006 | Ehresman | |
| 7,211,177 B2 | 5/2007 | Gestermann et al. | |
| 7,459,071 B2* | 12/2008 | Omasa | 205/628 |
| 7,670,495 B2 | 3/2010 | Senkiw | |
| 8,444,847 B1* | 5/2013 | Evans et al. | 205/628 |
| 2005/0087484 A1* | 4/2005 | Lambie | C02F 1/4672 210/192 |
| 2006/0081542 A1 | 4/2006 | Pulis et al. | |
| 2006/0163085 A1* | 7/2006 | Hanaoka | C02F 1/4618 205/742 |
| 2006/0273021 A1* | 12/2006 | Bagley | 210/695 |
| 2007/0173755 A1* | 7/2007 | Alimi et al. | 604/29 |
| 2007/0186958 A1* | 8/2007 | Field et al. | 134/21 |
| 2007/0243597 A1 | 10/2007 | Kenyon et al. | |
| 2008/0060943 A1 | 3/2008 | Zimmermann | |
| 2008/0283412 A1 | 11/2008 | Giddey et al. | |
| 2009/0281480 A1 | 11/2009 | Orlebeke et al. | |
| 2011/0048962 A1* | 3/2011 | Reece | C25B 1/04 205/633 |
| 2014/0023724 A1* | 1/2014 | Fujimura | C02F 1/4678 424/600 |

OTHER PUBLICATIONS

Steininger (PPM or ORP—Which Should be Used, Nov. 1985, 6 pages).*
International Search Report for PCT Application No. PCT/US13/074270; filed on Dec. 11, 2013; 10 pages.
Shirahata, et al.; "Elecrtolyzed-Reduced Water Scavenges Active Oxygen Species and Protects DNA form Oxidative Damage" Mar. 21, 1997; Biochemical and Biophysical Research Communications 234; pp. 269-274.
Gache, Gabriel; "Water Electrolysis Made Easy by Revolutionary Electrode"; Aug. 1, 2008; printed from website http;//news.softpedia.com/news/Water-Electrolysis is Made Easy by Revolutionary Electrode; printed on Oct. 28, 2010.
"Electrolysis of Water" printed from website http://en.wikipedia.org/wiki/Electrolysis of Water; pp. 1-7; printed on Jun. 14, 2011.

* cited by examiner

PROCESS FOR GENERATING OXYGENATED WATER

BACKGROUND OF THE INVENTIVE CONCEPTS

1. Field of the Inventive Concepts

The inventive concepts disclosed and claimed herein relate generally to a method for generating oxygenated water and, more particularly, but not by way of limitation, to a method utilizing electrolysis to increase the quantity of dissolved oxygen in the water.

2. Brief Description of Related Art

Increasing the oxygen content of water has many benefits and common applications have included treatment of aquarium water as well as pond and lake water. The most common methods for oxygenating aquarium and pond water involve sparging of the water with air, oxygen or oxygen-enriched air. Sparging processes are generally considered very inefficient.

Electrolysis of water to generate oxygen and hydrogen is also well known. For electrolytic production of hydrogen and oxygen from water, a voltage is applied across an anode and a cathode which are immersed in the water. The theoretical voltage required for disassociation of water is about 1.23 volts; however, in practice the applied voltage is higher. Hydrogen gas is produced at the cathode and oxygen is produced at the anode. Typically the gases form bubbles which rise to the surface and are collected. Care must be taken to separate and handle the hydrogen in a safe manner as the hydrogen can otherwise present a serious safety hazard.

Theories have developed citing various health benefits attributable to increased oxygen content in drinking water. As a result, a number of processes have been developed for increasing the concentration of dissolved oxygen in water. For example, U.S. Pat. No. 5,728,287, issued to Hough et al. in 1998, discloses a method of oxygenating water with electrolytic cells wherein the hydrogen tends to "bubble out of solution" while a portion of the oxygen molecules remain in the water.

However, currently available methods for generating oxygenated water often do not achieve the desired oxygen levels, and can involve inherent process inefficiencies and/or safety hazards. Thus, there remains a need for improved methods for increasing the dissolved oxygen content in water to desired levels with greater efficiency and with fewer safety issues.

SUMMARY OF THE INVENTIVE CONCEPTS

A method for increasing the level of dissolved oxygen in drinking water includes treating water by adding a chemical oxidant to the water to increase the oxidation-reduction potential (ORP) of the water to between about 400 and 850 mV, and passing the treated water through an electrolytic cell. The electrolytic cell generates oxygen gas while applying a voltage of less than 300 mV. The dissolved oxygen content of the drinking water exiting the electrolytic cell ranges between about 90% of saturation to super saturated.

In one embodiment, a chemical chlorinating oxidant is added to water to increase the oxidation-reduction potential (ORP) of the water to between about 400 and 850 mV. At least a portion of the water can be chilled to increase the solubility of dissolved oxygen therein. The water with the chemical chlorinating oxidant is passed through an electrolytic cell having an applied voltage less than about 300 mV, and wherein oxygen gas is generated therefrom. The water exiting the electrolytic cell has a dissolved oxygen content of about 90% of saturation to super saturated.

Thus, utilizing (1) the technology known in the art; (2) the above-referenced general description of the presently claimed and disclosed inventive concept(s); and (3) the detailed description of the inventive concepts that follows, the advantages and novelties of the presently claimed and disclosed inventive concept(s) are readily apparent to one of ordinary skill in the art.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, and drawings. The figures are not necessarily to scale and certain features and certain views of the figures may be shown exaggerated, to scale or in schematic in the interest of clarity and conciseness. In the drawings.

DETAILED DESCRIPTION OF EXEMPLARY EMBODIMENTS

Figure 1:
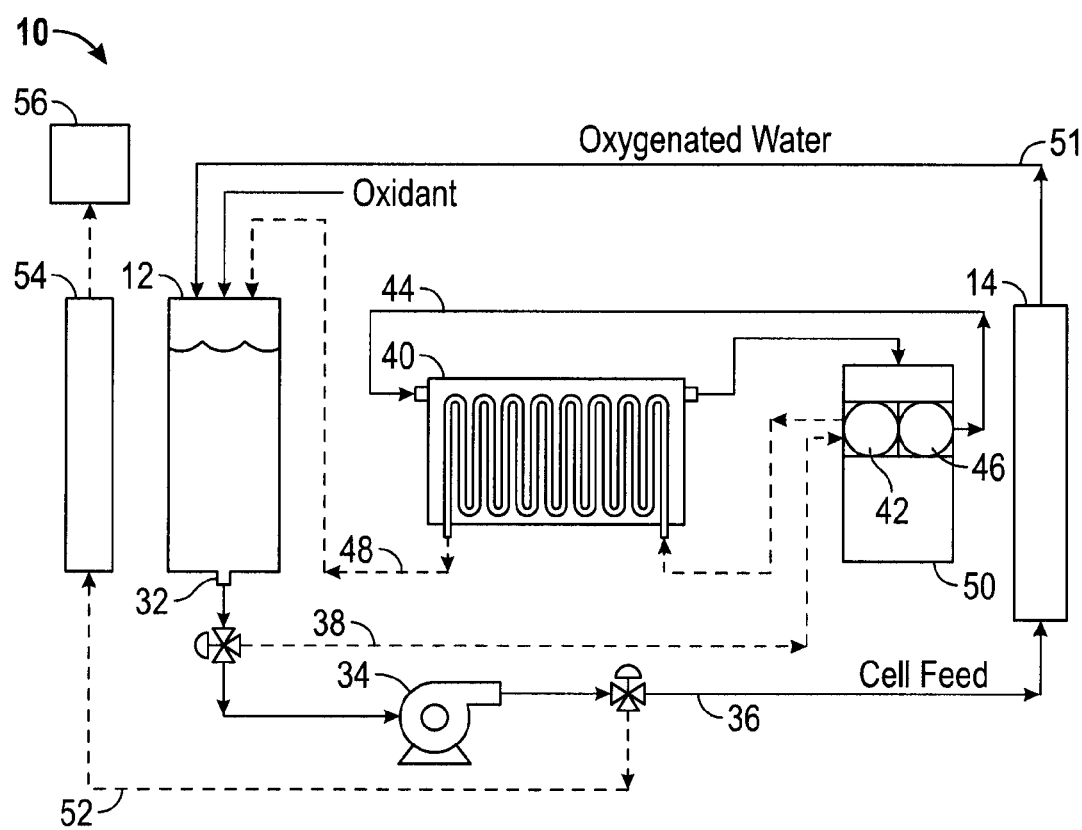
FIG. 1 is a simplified flow diagram of a batch process for water oxygenation according to an embodiment of the presently claimed and/or disclosed inventive process(es), methodology(ies), apparatus(es) and composition(s).

Before explaining at least one embodiment of the presently disclosed and claimed inventive concept(s) in detail, it is to be understood that the presently disclosed and claimed inventive concept(s) is not limited in its application to the details of construction, experiments, exemplary data, and/or the arrangement of the components set forth in the following description or illustrated in the drawings. The presently disclosed and claimed inventive concept(s) is capable of other embodiments or of being practiced or carried out in various ways. Also, it is to be understood that the phraseology and terminology employed herein is for purpose of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

There is a need for improved methods for increasing the quantity of dissolved oxygen in water. As mentioned above, a variety of methods have been studied for improving oxygenation using both gas sparging and electrolytic approaches. Previous electrolytic approaches continue to use voltages over 1.23 V, i.e. above the theoretical voltage necessary for decomposition of pure water into hydrogen and oxygen, and therefore must contend with the safety issues inherent in production of hydrogen gas. Surprisingly, it has been discovered that the oxygen content of water can be increased to the saturation level and above by addition of a chemical oxidant to the water followed by electrolysis of the water at 300 mV or less. By operating at this lower voltage, the oxygen formed remains dissolved in the water.

Referring now to FIG. 1, shown therein is an example flow sheet for a water oxygenation process 10 constructed in accordance with the presently claimed and/or disclosed inventive process(es), methodology(ies), apparatus(es) and composition(s). A water storage tank 12 can be used to hold the water to be oxygenated. A chemical oxidant can be added to the water to produce a cell feed. The cell feed is then passed through an electrolytic cell(s) 14 to produce oxygenated water. In a batch production mode, as shown in FIG. 1, water and a measured amount of chemical oxidant can be added directly to the water storage tank 12 to make the cell feed. Cell feed can be caused to flow directly to the electrolytic cell(s) 14.

In one embodiment, a method for increasing the quantity of dissolved oxygen in water includes adding sufficient chemical oxidant to the water to increase the oxidation-reduction potential (ORP) of the water to 400 mV or higher. In another embodiment, sufficient chemical oxidant is added to the water to bring the ORP of the resulting cell feed to between 400 mV and 850 mV. The water with the chemical oxidant, i.e. cell feed, is then fed to the electrolytic cell(s) 14 wherein oxygen is generated from a portion of the cell feed while maintaining a voltage across the electrolytic cell(s) 14 of less than 300 mV. The oxygen remains dissolved in the water such that the water exiting the electrolytic cell(s) 14 contains at least 90% oxygen saturation and is often supersaturated.

The water to be oxygenated by the methods described herein can be used for watering plants or crops or used for human consumption. It has long been known that plants thrive on oxygenated water. However, health improvements and increased energy in humans have also been attributed to increased oxygen levels in drinking water. The water to be oxygenated by the methods described herein can be surface water or well water. Well water frequently contains no dissolved oxygen or very low levels of dissolved oxygen. The degree of oxygen saturation in surface water depends on a number of factors including water depths, temperature, and seasonal variations. However, even under the most favorable conditions, the dissolved oxygen in surface water is rarely near saturation.

Hard and somewhat brackish waters can sometimes already contain oxidants. For example, well waters are typically treated with chlorine prior to use as drinking water. It has been found, however, that regardless of previous treatment, the addition of a chemical oxidant to the drinking water prior to electrolysis allows for improved electrolytic production of dissolved oxygen. Examples of suitable oxidants include, but are not limited to, ozone, hydrogen peroxide, chlorine gas, chlorine dioxide, sodium hypochlorite, hypochlorous acid, and combinations thereof.

In many applications the chemical oxidant is, or includes, a chlorinating compound. Chlorine is one of the most widely used disinfectants. It is very effective for deactivation of pathogenic microorganisms. Chlorine can be easily applied, measured and controlled, and is relatively cheap. Chlorine has been used for applications, such as the deactivation of pathogens in drinking water, swimming pool water and wastewater, for the disinfection of household areas and for textile bleaching, and can be used as a chemical oxidant in the presently described process.

Bleach is typically formed by dissolving chlorine gas in an alkali-solution, such as sodium hydroxide (NaOH). When chlorine is dissolved in an alkaline solution, hypochlorite ions ($OCl^-$) are formed; i.e., chlorine reacts with sodium hydroxide to form sodium hypochlorite (NaOCl). In one embodiment, the chemical oxidant comprises sodium hypochlorite. For example, sodium hypochlorite can be added as household bleach in an amount of about 0.2 cup to about 10 cups (47 to 2366 mL) of bleach per 2500 gallons (9,464 L) of water. Commercially available household bleaches typically contain about 3 to 7% by weight sodium hypochlorite as well as a lesser amount of sodium hydroxide. An example of suitable commercially available bleach is Clorox® manufactured by the Clorox Company. In one embodiment, bleach having about 3% to 7% by weight sodium hypochlorite as well as a lesser amount of sodium hydroxide is added to the water in a range of from about 50 mL to about 2500 mL of bleach for each 10,000 L of water.

While it is not always necessary to add the chemical oxidant or to raise the ORP of the drinking water above about 400 mV, doing so increases the final dissolved oxygen content of the water achievable by low voltage electrolysis. While not intending to be limited to the chemical mechanism involved, it is presumed that the chemical oxidant, rather than water, is reduced at the cathode surface. For example, sodium hypochlorite, NaOCl, can be reduced at the cathode to form NaCl at a lower electrode potential than occurs with reduction of water, $H_2O$, to form hydrogen, $H_2$, thus lowering the overall cell voltage. Alternatively, hypochlorous acid can be reduced to hydrochloric acid (HCl) and oxygen (O), wherein the oxygen atom is very reactive and could, upon contact with another O, form dissolved oxygen. In either case, the chemical oxidant is electrochemically reduced in the electrolytic cell and dissolved oxygen is formed. Such mechanisms explain the low voltage requirements of the electrolytic cell, the high dissolved oxygen content of the water after electrolysis, and the lessening of any smell or taste of chlorine in the water after electrolysis even when bleach is present in the electrolysis feed.

In addition to oxidation-reduction potential, and as understood by those skilled in the art, the salt content of water affects the conductivity of the water. For example, drinking water containing about 15 to 60 mg/L sodium can be fed to the electrolytic cell(s) 14 and exhibits improved conductivity compared to lower salt content water. Multivalent cations and anions, even at lower concentrations of, for example, 10 to 20 mg/L calcium and/or magnesium, provide greater conductivity than monovalent ions. Although quite satisfactory conductivity can be achieved with sodium salts, excellent results have been achieved using drinking water with a total alkalinity, prior to addition of the chemical oxidant, in the range of from about 50 to about 150 mg/L reported as $CaCO_3$. In one embodiment, the water has a bicarbonate alkalinity, prior to addition of the chemical oxidant, in the range of from about 50 to about 150 mg/L reported as $CaCO_3$.

Figure 2:
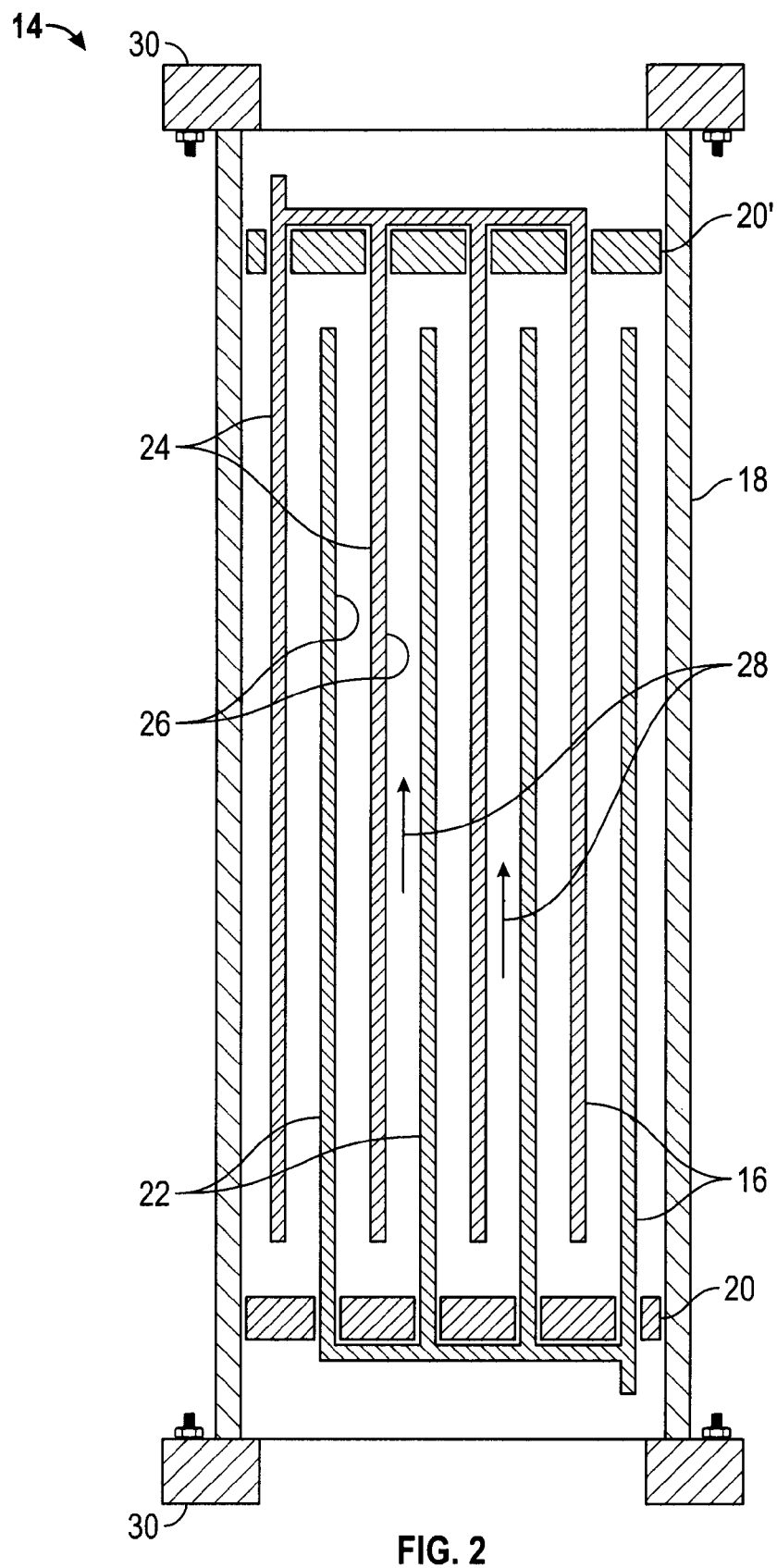
FIG. 2 is a schematic representation of an electrolytic cell that can be used for increasing the dissolved oxygen content of water.
Figure 3:
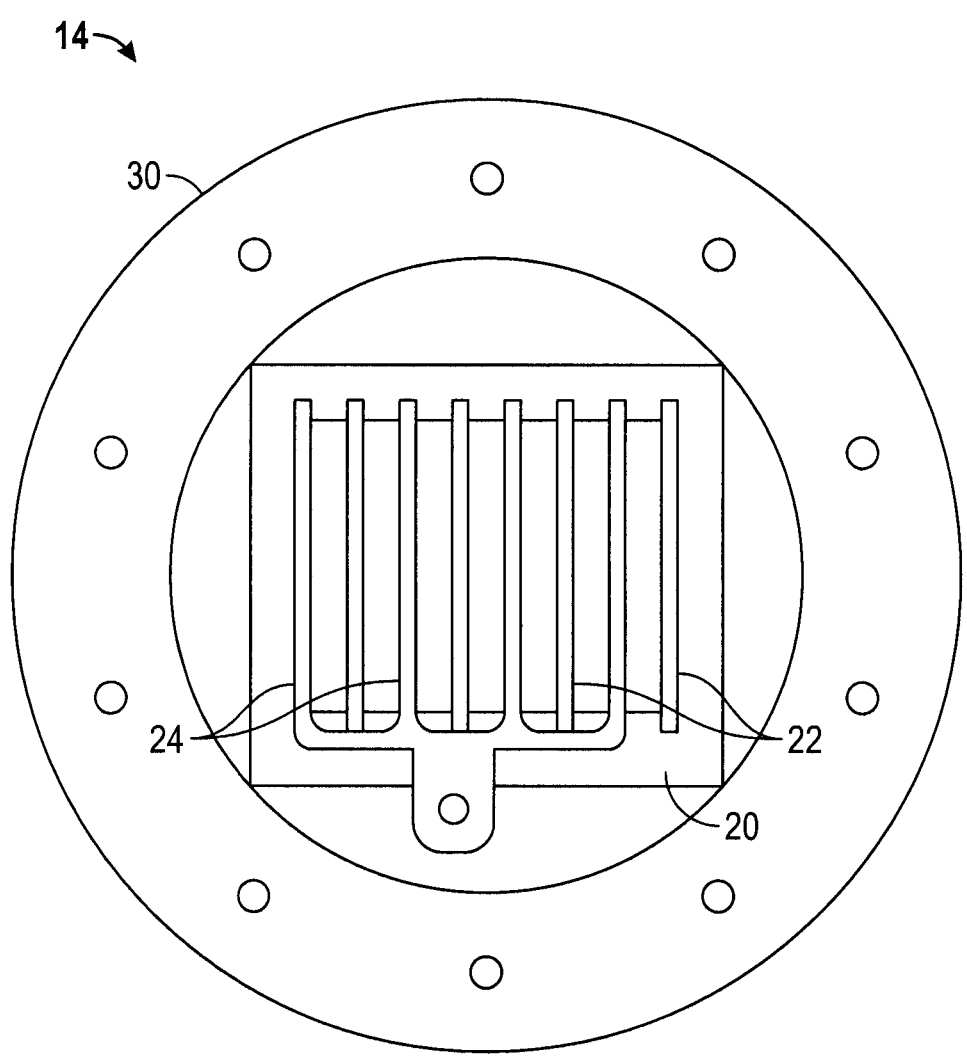
FIG. 3 is a longitudinal view of the electrolytic cell shown in FIG. 2.

As illustrated in FIGS. 2 and 3, the electrolytic cell(s) 14 can include two or more electrodes 16 housed in an electrolysis canister 18. The electrodes 16 can be held in place by spacers 20 and 20' such that one spacer 20 holds the positive electrodes or cathodes 22, and a second spacer 20' holds the negative electrodes or anodes 24. The flow of cell feed is directed parallel to the electrode surfaces 26 in the direction indicated by reference arrows 28.

FIGS. 2 and 3 illustrate a single electrolysis canister 18 having four cathodes 22 and four anodes 24; however, the number of electrodes 16 per electrolysis canister 18, as well as the electrode dimensions can vary. In one embodiment, the electrode dimensions are about 30 inches long by about two inches wide and the electrode spacing (anode to cathode) in the cell is about 0.2 inches.

The electrodes 16 can be made of a variety of metals such as nickel, stainless steel, or titanium, with dimensions varying with the specific application. Electrode coatings such as known in the art can be included. In one embodiment, the electrodes 16 are titanium metal or titanium alloy.

The electrolysis canister 18 can be any rigid, electrically insulating material including plastics such as polyvinyl chloride (PVC), acrylic, Plexiglas® and the like. In one embodiment, the rigid tubing is a transparent acrylic which allows visual observation of the electrolytic process and electrodes during operation. A flange 30 can be used to connect the electrolysis canister 18 to piping for cell feed and cell discharge.

The spacers 20 and 20' can be any rigid, electrically insulating material capable of being grooved to hold the edges of the electrodes in a specific position relative to one another. Suitable spacer materials include, but are not limited to, polypropylene, PVC, high-density polyethylene (HDPE) and ABS polymers and the like.

Power to the electrolytic cell(s) can be provided using equipment and methods known to those skilled in the art. For example, 240 V alternating current can be converted to one of constant polarity (positive or negative) by full-wave rectification using four diodes arranged as a diode bridge or bridge rectifier. The resulting direct current and voltage still cycles, but as a series of half waves, the output voltage having a half wave peak value and a root-mean-square value. After reducing the voltage to the desired peak voltage, typically less than 300 mV, the cycling-voltage DC can be connected to the electrolytic cell. Unless specified otherwise, voltage values for a cycling-voltage DC, herein and in the appended claims, refer to the peak voltage.

In order to produce steady DC from a rectified AC supply, a smoothing circuit or filter can be utilized. A very simple example is a smoothing capacitor placed at the DC output of the rectifier. Some AC ripple voltage will still remain but can be smoothed using a filter or a voltage regulator. Such adaptors are readily purchased commercially, and can then be stepped down to the desired voltage, typically less than 300 mV.

Control of the electrolysis operation is achieved using instrumentation and methods known to those skilled in the art. Production of oxygenated product water can include continuous or batch measurement of the dissolved oxygen in terms of both actual content (mg/L or ppm) and as a percent of saturation (% DO).

Referring back to FIG. 1, in a batch production mode, water and a measured amount of chemical oxidant can be added directly to the water storage tank 12 to make the cell feed. Cell feed can be removed from the water storage tank 12 through a storage tank exit 32 located, for example, near the bottom of the water storage tank 12. The cell feed can be directed by a cell feed pump 34 to the electrolytic cell(s) 14 via a cell feed conduit 36. An exit conduit 51 can send the oxygenated water to a product water vessel (not shown) in a continuous manner, or can return the oxygenated water to the water storage tank 12 in a batch manner, or a combination of both.

While the saturation level of dissolved oxygen also varies with barometric pressure and salinity of the water, temperature has the most significant effect. For example, for fresh water at sea level and at 86° F. (30° C.), the dissolved oxygen saturation is 7.5 mg/L and increases to 11.3 mg/L when the water is cooled to 50° F. (10° C.). For comparison, the calculated saturation of dissolved air in water at 77° F. (25° C.) is 0.023 g/kg at one atmosphere and increases to 0.045 g/kg when the air pressure is doubled to two atmospheres. Increasing the partial pressure of oxygen also increases the saturation level of dissolved oxygen. While these temperature and pressure adjustment do not by themselves increase the oxygen content of the water, they do increase the amount of oxygen that can be added to the water by the electrolytic cell(s) 14. Thus, incorporation of process steps and equipment to cool the water, increase the air pressure in contact with the water, and/or increase the oxygen partial pressure of the air in contact with the water, can be used to further increase the saturation level of dissolved oxygen to be added to the water by the electrolytic cell(s) 14. Process steps and equipment that can be used to cool the water, increase the air pressure in contact with the water, and/or increase the oxygen partial pressure of the air in contact with the water, are known to those skilled in the art.

In one embodiment, a portion or all of the cell feed stream leaving the water storage tank 12 can be diverted via a cooler feed conduit 38 to a heat exchanger 40 using, for example, a water cooling pump 42. A coolant can be circulated to and from the heat exchanger 40 via a coolant conduit 44 using a coolant pump 46 in order to provide cooling to the water. Cold water exits the heat exchanger 40 via a cold water conduit 48 and can be returned to the top of the water storage tank 12. The heat exchanger 40 can utilize any cooling fluid known to the art, for example, ethylene glycol. A chiller 50, such as a glycol chiller, chills the cooling fluid to the necessary temperature using known equipment and procedures. Cold water exiting the heat exchanger 40 can readily be chilled to a temperature of around 35° to about 38° F. By varying the flow rate of water to the heat exchanger, the temperature of the water in the storage tank 12 can be controlled at a desired reduced temperature, thereby increasing the potential saturation level of dissolved oxygen.

Control of the cooling and electrolysis operations can be achieved using instrumentation and methods known to those skilled in the art. Production of the oxygenated product water can include continuous or batch measurement of the dissolved oxygen in terms of both actual content (mg/L or ppm) and as a percent of saturation (% DO). A cell exit conduit 51 can send the oxygenated water to a product water vessel (not shown) in a continuous manner, or can return the oxygenated water to the water storage tank 12 in a batch manner, or a combination of both.

Once the water has circulated through the electrolytic cell(s) 14 sufficiently to reach the desired dissolved oxygen content, it can be pumped via a filter feed line 52 to an activated carbon filter(s) 54 for removal of residual chlorine.

The filtered water can then be bottled using water bottling equipment 56 and procedures known to those skilled in the art. Oxygenated water can be bottled in, for example, standard 12, 18 or 24 oz drinking bottles or in larger bottles for office or home kitchen use. Unlike most oxygenated water available, the oxygenated water produced by the presently claimed and disclosed inventive process(es), methodology(ies), and apparatus(es) retains its dissolved oxygen content at levels approximating saturation for at least six months after manufacture and bottling.

In order to further illustrate the present invention, the following examples are given. However, it is to be understood that the examples are for illustrative purposes only and are not to be construed as limiting the scope of the invention.

Example 1

A 50 gallon sanitized holding tank was filled with chlorinated well water used commercially for bottled drinking water. The water was measured for quantity of dissolved oxygen (ppm or mg/L DO), the dissolved oxygen relative to equilibrium oxygen saturation, i.e., percent of saturation (% DO), temperature, and the emf or oxidation-reduction potential (ORP). Approximately 10 mL of Clorox® household bleach was added to the 50 gal water tank. The water was pumped from the bottom of the tank through two pumps to two 33.5-inch long electrolytic cell canisters in parallel. Each electrolytic cell canister had a total of 8 titanium electrodes, 4 anodes and 4 cathodes. The electrodes were each 2 inches wide, 30 inches long and 1/16 inch thick. Electrode spacing was 0.2 inch. The cell housing was made of Delrin®, a transparent, electrically insulating acrylic manufactured by DuPont. Water exiting the cell was returned to the holding tank through a vertical downcomer pipe internal to the holding tank with an outlet part way from the top surface.

Direct current for electrolysis was obtained using a bridge rectifier without smoothing. The peak voltage of the pulsating direct current to the electrolytic cells was reduced and remained less than 300 mV, but varied with changing cell resistance. The voltage was applied in parallel to the electrodes within each canister, and in series to the two electrolytic cell canisters.

Water properties were continuously monitored using meters and a data logger from Hanna Instruments of Australia. The instruments measured the water temperature, pH, ORP, dissolved oxygen as % DO (percent of saturation) and as DO ppm, resistivity, dissolved solids, salinity and pressure. The probes were placed near the center of the holding tank.

Table 1 shows the oxygen content of the water before and after electrolysis. As can be seen, the dissolved oxygen content of the water was increased from about 3 ppm to near saturation at 9.4 about ppm. A detailed chemical analysis of the well water, before and after similar electrolysis, is shown in Table 2.

TABLE 1

Example 1 Oxygenation Summary

|  | DO ppm | % DO | T, °F. | ORP |
|---|---|---|---|---|
| Water Initially | 3.12* | 40* | 59 | 318 |
| Water After Electrolysis | 9.4 | 94.6 | 59 | 834 |

*measured at 81° F.

TABLE 2

Chemical analysis of Well Water Before and After Oxygenation

| Analyte | Results, mg/L Before | Results, mg/L After | Reporting Limits, mg/L |
|---|---|---|---|
| Carbonate Alkalinity, reported as CaCO$_3$ | <0.88 | <0.88 | 0.088 |
| Bicarbonate Alkalinity, reported as CaCO$_3$ | 87.8 | 114 | 0.88 |
| Total Alkalinity, reported as CaCO$_3$ | 87.8 | 114 | 0.88 |
| pH | 7.22 | 7.99 | |
| Bromide | <1.2 | <1.2 | 1.2 |
| Chloride | 31.8 | 34.2 | 0.70 |
| Nitrate | 3.2 | 2.8 | 1.2 |
| Nitrite | <0.39 | <0.39 | 0.39 |
| Phosphate | <2.7 | <2.7 | 2.7 |
| Sulfate | 2.3 | 1.7 | 1.5 |
| Fluoride | <0.54 | <0.54 | 0.54 |
| Ammonium | <0.39 | <0.39 | 0.39 |
| Calcium | 13.8 | 15.7 | 0.22 |
| Lithium | <0.11 | <0.11 | 0.11 |
| Magnesium | 1.41 | 1.36 | 0.16 |
| Potassium | 1.61 | 1.85 | 0.38 |
| Sodium | 31.2 | 42.6 | 0.32 |
| Mercury | <0.000032 | <0.000032 | 0.000032 |
| Aluminum | 0.012 | <0.010 | 0.010 |
| Antimony | <0.025 | <0.025 | 0.025 |
| Arsenic | <0.010 | <0.010 | 0.010 |
| Barium | 0.0955 | 0.0835 | 0.0025 |
| Beryllium | <0.0050 | <0.0050 | 0.0050 |
| Cadmium | <0.0025 | <0.0025 | 0.0025 |
| Chromium | <0.0050 | <0.0050 | 0.0050 |
| Cobalt | <0.0025 | <0.0025 | 0.0025 |
| Copper | 0.0043 | <0.0025 | 0.0025 |
| Iron | 0.059 | <0.050 | 0.050 |
| Lead | 0.0027 | <0.0025 | 0.0025 |
| Manganese | 0.0789 | 0.101 | 0.0050 |
| Molybdenum | <0.0025 | <0.0025 | 0.0025 |
| Nickel | <0.0050 | <0.0050 | 0.0050 |
| Selenium | <0.025 | <0.025 | 0.025 |
| Silver | <0.0025 | <0.0025 | 0.0025 |
| Thallium | 0.0057 | <0.0050 | 0.0050 |
| Titanium | <0.0050 | <0.0050 | 0.0050 |
| Vanadium | <0.0025 | <0.0025 | 0.0025 |
| Zinc | <0.025 | <0.025 | 0.025 |

Example 2

Figure 4:
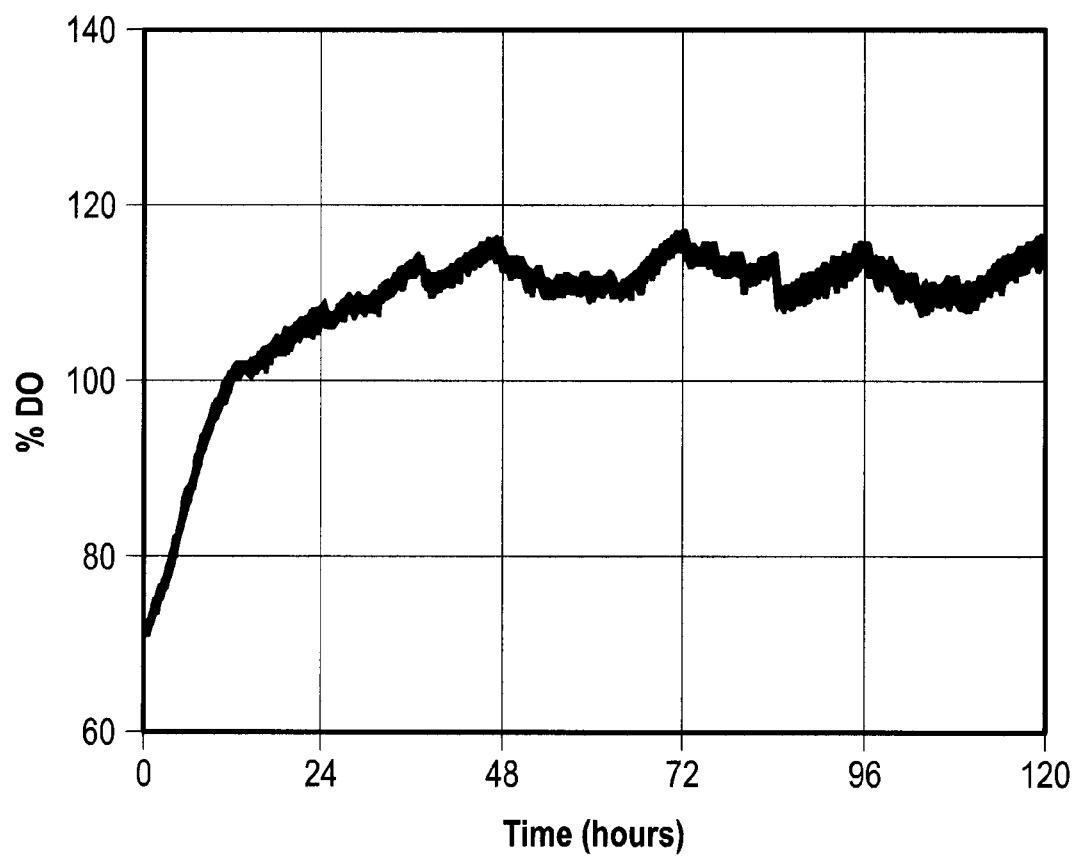
FIG. 4 is a graphical representation of the increase in dissolved oxygen found in Example 2.

A similar test was run wherein the electrolytic cell voltage was less than 300 mV and was monitored using a dataTaker® DT82E Series 2 data logger designed especially for R&D and environmental monitoring and available from Computer Aided Solutions in Chesterland, Ohio. An outer cylinder surrounding the cell feed tank was filled with ice cubes to act as a cooling jacket. Fresh ice cubes were added when necessary to maintain the temperature of the cell feed water in the feed tank at 50° F. After addition of 10 mL Clorox® to the 50 gal tank of cell feed water, the ORP of the water increased to 830 mV. The water was circulated through the electrolytic cells for five days. On the third day the dissolved oxygen content of the water increased to 12 ppm and 115% of saturation. FIG. 4 shows the increase in dissolved oxygen content over time.

TABLE 3

Example 2 Oxygenation Summary

| | DO ppm | % DO | T, °F. | ORP |
|---|---|---|---|---|
| Water Initially | 9.0 | 72 | 50 | 229 |
| Water After Electrolysis | 12 | 115 | 52 | 834 |

Example 3

Water was oxygenated using the same procedure as described in Example 1, but without addition of Clorox® prior to electrolysis. A summary of the results is given in Table 4 below. As can be seen, oxygenation still occurs, but to a lesser level than with addition of a chemical oxidant prior to electrolysis. Oxygenated water was recycled to the feed tank and electrolysis was continued for several days.

TABLE 4

Summary of Electrolysis without Chemical Oxidant

| | DO ppm | % DO | T, °F. | ORP |
|---|---|---|---|---|
| Water Initially | 3.12* | 40* | 72 | 318 |
| Water After Electrolysis | 8.2 | 98 | 72 | 732 |

*measured at 81° F.

Example 4

Water was oxygenated using the same procedure as described in Example 1, but the titanium electrodes were replaced with titanium palladium alloy electrodes. A summary of the results is given in Table 5 below. Oxygenated water was recycled to the feed tank and electrolysis was continued for several days. As can be seen, oxygenation occurs as with non-alloyed titanium electrodes.

TABLE 5

Summary of Electrolysis with Ti—Pd Electrodes

| | DO ppm | % DO | T, °F. | ORP |
|---|---|---|---|---|
| Water Initially | 3.12* | 40* | 72 | 318 |
| Water After Electrolysis | 8.7 | 100 | 70 | 821 |

*measured at 81° F.

Example 5

Previous tests used well water as the drinking water source. To test the oxygenation process on treated surface water, a city drinking water was used. The city purified lake water by chemical treatment followed by settling, filtration and disinfection. Disinfection to kill bacteria used either a combination of chlorine and ammonia (chloramines) or ozone disinfection along with chloramines.

The treated surface water was oxygenated using the same procedure as described in Example 1. Oxygenated water was recycled to the feed tank and electrolysis was continued for several days. A summary of the results is given in Table 6 below. As can be seen, oxygenation occurs with the surface water as it did with well water.

TABLE 6

Summary of Electrolysis with Treated Surface Water

| | DO ppm | % DO | T, °F. | ORP |
|---|---|---|---|---|
| Water Initially | 3.8* | 49* | 69 | 330 |
| Water After Electrolysis | 10.1 | 115 | 69 | 593 |

*measured at 81° F.

Example 6

Water was oxygenated using the same procedure as described in Example 1, but in this case the power supply was smoothed to provide a constant voltage. A summary of the results is given in Table 7 below. Oxygenated water was recycled to the feed tank and electrolysis was continued for several days. Again, positive results are obtained; however, the oxygen content using constant voltage does not appear quite as high as the oxygen obtained using a voltage that cycles as a series of half waves as in the previous examples.

TABLE 7

Summary of Electrolysis with Constant Voltage

| | DO ppm | % DO | T, °F. | ORP |
|---|---|---|---|---|
| Water Initially | 3.12* | 40* | 72 | 318 |
| Water After Electrolysis | 7.9 | 94 | 74 | 599 |

*measured at 81° F.

From the above examples and descriptions, it is clear that the present inventive process(es), methodology(ies), apparatus(es) and composition(s) are well adapted to carry out the objects and to attain the advantages mentioned herein, as well as those inherent in the presently provided disclosure. While presently preferred embodiments of the invention have been described for purposes of this disclosure, it will be understood that numerous changes may be made which will readily suggest themselves to those skilled in the art and which are accomplished within the spirit of the presently claimed and disclosed inventive process(es), methodology(ies), apparatus(es) and composition(s) described herein.

What is claimed is:

1. A method for generating dissolved oxygen in drinking water, the method consisting essentially of the following steps:
    adding an oxidant comprising sodium hypochlorite and sodium hydroxide to drinking water having an oxidation-reduction potential (ORP) of less than 400 mV, a dissolved oxygen content of 9 ppm or less, and a total alkalinity in the range of from about 50 to about 150 mg/L reported as $CaCO_3$, the oxidant added in an amount sufficient to increase the oxidation-reduction potential (ORP) of the drinking water to between about 400 and 850 mV, thereby producing a cell feed;
    filling an electrolytic cell having a titanium or titanium alloy cathode and a titanium or titanium alloy anode with the cell feed;
    applying a voltage across the electrolytic cell in a range of greater than 0 mV to about 300 mV; and
    producing oxygen by electrolysis and thereby making oxygenated drinking water having a dissolved oxygen content ranging from 90% to 115% of saturation.

2. The method of claim 1 wherein the step of adding an oxidant comprises adding between about 50 mL to about 2500 mL of oxidant for each 10,000 L of drinking water, and wherein the oxidant comprises sodium hydroxide and 3 to 7 percent by weight sodium hypochlorite.

3. The method of claim 1, wherein the oxidant added to the drinking water is electrochemically reduced in the electrolytic cell.

4. The method of claim 1, wherein the voltage across the electrolytic cell is between 100 mV and 300 mV.

5. The method of claim 1, wherein voltage across the electrolytic cell cycles as a series of half waves.

6. The method of claim 1, wherein the drinking water has a bicarbonate alkalinity in the range of from about 50 to about 150 mg/L reported as $CaCO_3$.

7. The method of claim 1, wherein the cell feed contains about 10 to 20 mg/L calcium.

8. The method of claim 1, wherein the cell feed contains about 15 to 60 mg/L sodium.

9. The method of claim 8, wherein the cell feed is passed through a plurality of electrolytic cells fluidically coupled in parallel.

10. The method of claim 8, further comprising the step of chilling at least a portion of the cell feed to increase the solubility of dissolved oxygen therein.

11. The method of claim 8, wherein the oxygenated drinking water exiting the electrolytic cells is recirculated to a holding tank feeding the electrolytic cells such that the quantity of dissolved oxygen in the drinking water is increased in a batch fashion.

12. A method for generating dissolved oxygen in drinking water, the method consisting essentially of the following steps:
　adding an oxidant comprising sodium hypochlorite and sodium hydroxide to drinking water having an oxidation-reduction potential (ORP) of less than 400 mV, a dissolved oxygen content of 9 ppm or less, and a total alkalinity in the range of from about 50 to about 150 mg/L reported as $CaCO_3$, the oxidant added in an amount sufficient to increase the oxidation-reduction potential (ORP) of the drinking water to between about 400 and 850 mV;
　chilling at least a portion of the drinking water to increase the solubility of dissolved oxygen therein; and
　passing the chilled drinking water with the oxidant into an electrolytic cell having a titanium or titanium alloy cathode and a titanium or titanium alloy anode;
　applying a voltage across the electrolytic cell in a range of greater than 0 mV to about 300 mV, generating oxygen gas electrolytically and thereby producing an oxygenated drinking water having a dissolved oxygen content ranging from about 90% to about 115% of saturation.

13. A method for generating dissolved oxygen in drinking water, the method consisting of the following steps:
　adding an oxidant comprising sodium hypochlorite and sodium hydroxide to drinking water having an oxidation-reduction potential (ORP) of less than 400 mV, a dissolved oxygen content of 9 ppm or less, and a total alkalinity in the range of from about 50 to about 150 mg/L reported as $CaCO_3$, the oxidant added in an amount sufficient to increase the oxidation-reduction potential (ORP) of the drinking water to between about 400 and 850 mV, thereby producing a cell feed;
　optionally chilling at least a portion of the drinking water to increase the solubility of dissolved oxygen therein;
　passing the drinking water with the oxidant into an electrolytic cell having a titanium or titanium alloy cathode and a titanium or titanium alloy anode;
　applying a voltage across the electrolytic cell in a range of greater than 0 mV to about 300 mV; and
　producing oxygen by electrolysis and thereby making oxygenated drinking water having a dissolved oxygen content ranging from 90% to 115% of saturation.

\* \* \* \* \*